8959X
M. H. Simpson.
Burring Mach.
Patented Jul. 7, 1835.
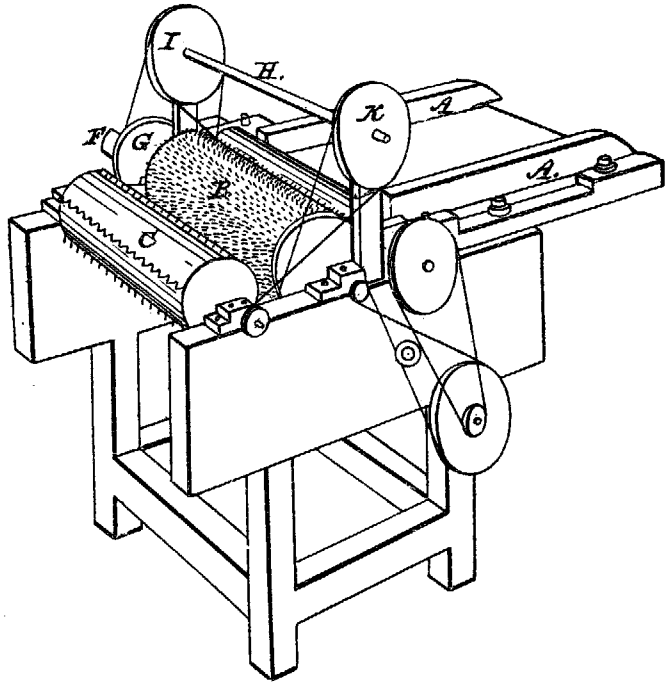
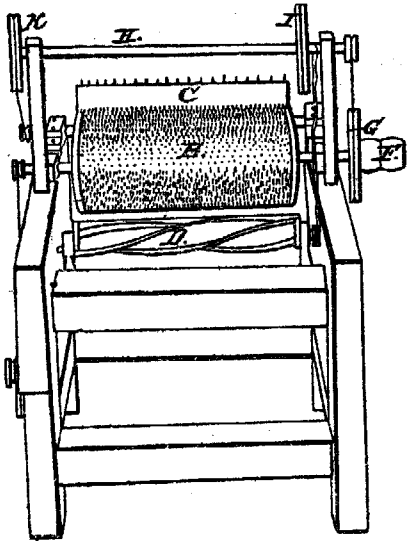
N. PETERS, PHOTO-LITHOGRAPHER, WASHINGTON, D. C.

8959X

M. H. Simpson of Boston, Massachusetts

Letters Patent

The schedule referred to in these Letters patent and making
part of the same, containing a description in the words of the
said M. H. Simpson himself of his improvement in the
Art of cleaning wool from burrs and other foreign sub-
-stances, To all persons to whom these presents shall come:
Be it known that I M. H. Simpson of the City of Boston,
County of Suffolk, State of Massachusetts, Merchant, have
invented a new and useful improvement in the art of
cleaning wool from burrs and other foreign substances
and that the following is a full and exact description of
the construction and use of said improvement; The con-
-struction of the Machine is as follows, The frame six feet
long, three feet high, and four feet wide, should be made
Stout and strong, the part upon which the wool is placed when
the burr is in it is called a feed frame which sets
upon the frame of the Machine and is in every respect
like the feed frame of a carding Machine which is so
well known to Mechanicks as to be unnecessary to describe
it; the feed frame is Marked A, upon the drawing a card
cylinder marked B, is placed horizontally across the frame
next to the feed roller in the feed frame, This cylinder seems
to work best when about eighteen inches diameter
with cards upon it of No. 24 or 28 wire rather thicker—
A tooth fan or cleaner is placed across the frame opposite
to the card cylinder B, seemed to work well when Twelve
inches diameter to be armed with six rows of teeth about half an inch long & as stout as a sailor needle, sett
half an inch apart. A Clipper frame mark'd B, is seen on
the drawing without the feed frame this is similar to clothing
shears, being a frame of cast iron with a blade with a
round edge screwed ~~[illegible]~~ upon it & a spiral shear
sett in box & adjustable to the card for operation by screws
which place it nearer or farther from the card as may be
required to perform more perfectly in detaching the burr
Motion is given to the main drawing pulley F. by Steam,
water, or animal power, the pulley G. on the same shaft
drives the shaft. H, which has upon it two pulleys - one to
drive the pulley clipper mark'd I. which being large and
communicating to a small pulley on the clipper drives
it with great ~~[illegible]~~ rapidity. The other pulley mark'd K,
communicates to the fan which also revolves rapidly, the
speed from my experiments should be about Two hundred
revolutions a minute to the card cylinder - the clipper about
twenty five hundred times pr Minute, and the fan fast enough
to clean the card cylinder having described the construction
of the Machine which will of course be varied to suit
the different fancies of the operators, I now describe the use
of said Machine - wool from South America and indeed
most all wools have more or less of a vegetable substance
called burrs so attached to it, that it is not taken out
by washing and therefore the only mode of cleaning the
wool has been by hand until about two years since a
Mechanick of the City of Boston Mr Samuel Brilliard
Jr ... invented a machine for the purpose which performed
the part of taking out the burr very well - but was set
aside from the injury the staple rec'd ..., The Machine for
which I now ask a patent performs the work of taking out
the Burr without any injury to the fibre, ~~The wool should~~
The wool should in the first place be well picked by a common wool picker, with the burr in it, and in this state
the machine receives it, it is placed by the operation in the
feed belt which when the machine is in operation is condu-
cted to the draw rolls which revolve very slow, and as the
wool is carried through the draw rolls with so much greater
rapidity than the feed rolls and carries it in a downward
direction by the clipper frame which is placed nearly in
contact with the surface of the teeth — the burrs and all
foreign substances are stopped by the blade in the clipper
frame and the swift revolutions of the clipper knocks
them off. The wool continues in the teeth of the card
cylinder and is overtaken by the fan which is placed
upon the opposite side to the clipper frame as is by the fan
blown or taken from the cylinder and deposited in a clean
state in the room which may be made for the purpose —
It can be seen by any one acquainted with machinery
that the application of knocking the burrs from card teeth
may be used by machinery of different constructions from
this, I have myself used it in a variety of ways
by placing the clipper frame on the main cylinder
of a common card machine, or by affixing a machine
like the one here described to the end of a carding
machine, the doffer of which to feed the cylinder instead
of a feed frame, and also to place the clipper frame upon
the tumblers of a card machine, knocking off the burrs, and
then go immediately to the main cylinder to be carded,
all these applications work well, and two or three of them
are now used by me, I therefore do not claim as my
invention any particular form of machinery to affect
the object of detaching burrs or other foreign substancy
from wool, but claim the application of knocking, blowing
brushing, or striking burrs or other foreign substancy from
the surface of card teeth or any other kind of teeth, I forward herewith to the Patent office of the United States and making part by way of illustration of the principles of this my specification, a small model of the same whereby the use, application, ~~&~~ construction of my said improvement are distinctly and accurately shewn, to the end that the said model may be kept in said office, in remembrance of this my invention and as belonging to and making part of this my specification, It being understood that the principle of my said invention is alone illustrated by said model - The annexed drawing to which my specification refers, presents two views of the machine and may assist the examiner to better understand the specifications.

In testimony that the forgoing is a true Specification of my said improvement as above described, I have hereunto set my hand this eleventh day of June eighteen hundred ~~&~~ thirty five, M. H. Simpson Witnesses
H. Haven
Thomas A. Dexter, Exd.
W.G.C.

(Drawing)

1110 words (Recd. & Recd. May First 1837.)